United States Patent
Norris

(10) Patent No.: US 6,527,278 B1
(45) Date of Patent: Mar. 4, 2003

(54) CORNER MOLD AND SEAL SYSTEM

(75) Inventor: Stephen R. Norris, Maineville, OH (US)

(73) Assignee: Norris Sales Associates, Inc., Mainville, OH (US)

( * ) Notice: Subject to any disclaimer, the term of this patent is extended or adjusted under 35 U.S.C. 154(b) by 102 days.

(21) Appl. No.: 09/708,787

(22) Filed: Nov. 8, 2000

(51) Int. Cl.[7] ................................................ B60J 10/08
(52) U.S. Cl. ........................ 277/630; 277/628; 277/637; 277/644; 277/648; 277/649; 277/921; 403/205; 403/231; 49/479.1
(58) Field of Search ................................ 277/312, 628, 277/630, 644, 648, 649, 637, 921; 49/470, 479.1, 490.1; 403/205, 231

(56) References Cited

U.S. PATENT DOCUMENTS

| | | | | |
|---|---|---|---|---|
| 3,455,965 A | * | 7/1969 | Paulus ........................ 549/545 |
| 3,518,792 A | * | 7/1970 | Williamson et al. ....... 49/479.1 |
| 3,717,955 A | * | 2/1973 | Urbanick .................... 49/479.1 |
| 3,885,351 A | * | 5/1975 | Imperial et al. .............. 49/470 |
| 4,042,741 A | | 8/1977 | Bright |
| 4,716,683 A | * | 1/1988 | Minter ....................... 49/479.1 |
| 4,928,431 A | * | 5/1990 | Kuzuhara et al. ........... 49/479.1 |
| 5,069,849 A | * | 12/1991 | Wain ........................... 264/138 |
| 5,352,009 A | | 10/1994 | Takeuchi |
| 5,499,475 A | * | 3/1996 | Court et al. ................... 49/368 |
| 5,718,084 A | * | 2/1998 | Takamiya .................... 49/440 |
| 6,067,760 A | * | 5/2000 | Nowell ........................ 403/231 |

* cited by examiner

Primary Examiner—Anthony Knight
Assistant Examiner—Christopher Boswell
(74) Attorney, Agent, or Firm—Calfee, Halter & Griswold LLP

(57) ABSTRACT

A corner mold is provided for use in a seal system which protects the corner of a structure from damage and deterioration and creates a barrier covering the gap between adjacent structures. The corner mold includes two external members distanced apart by an interconnecting spacer sized to match the width of the structure. In addition to the corner mold, the seal system includes two moldings and an adhesive which is placed in joints between the corner mold and moldings.

20 Claims, 5 Drawing Sheets

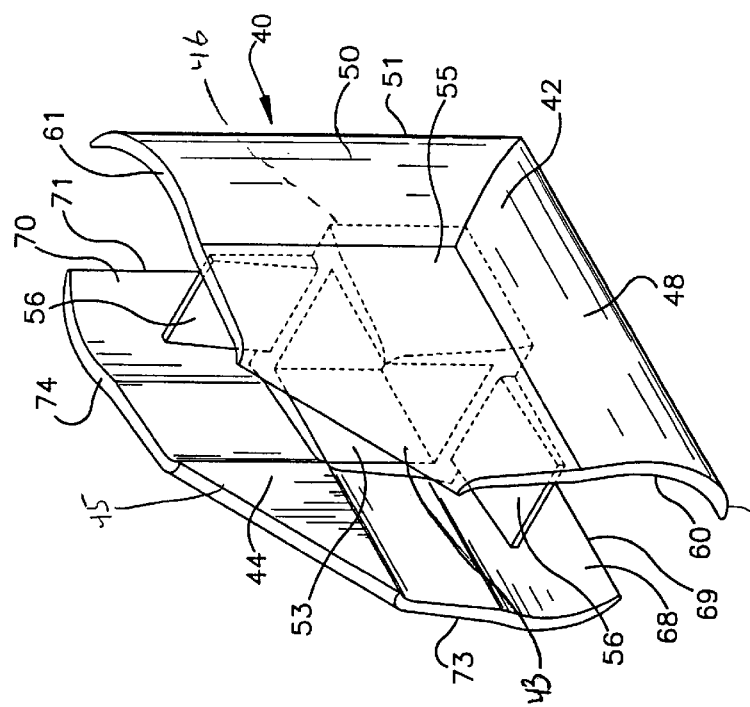
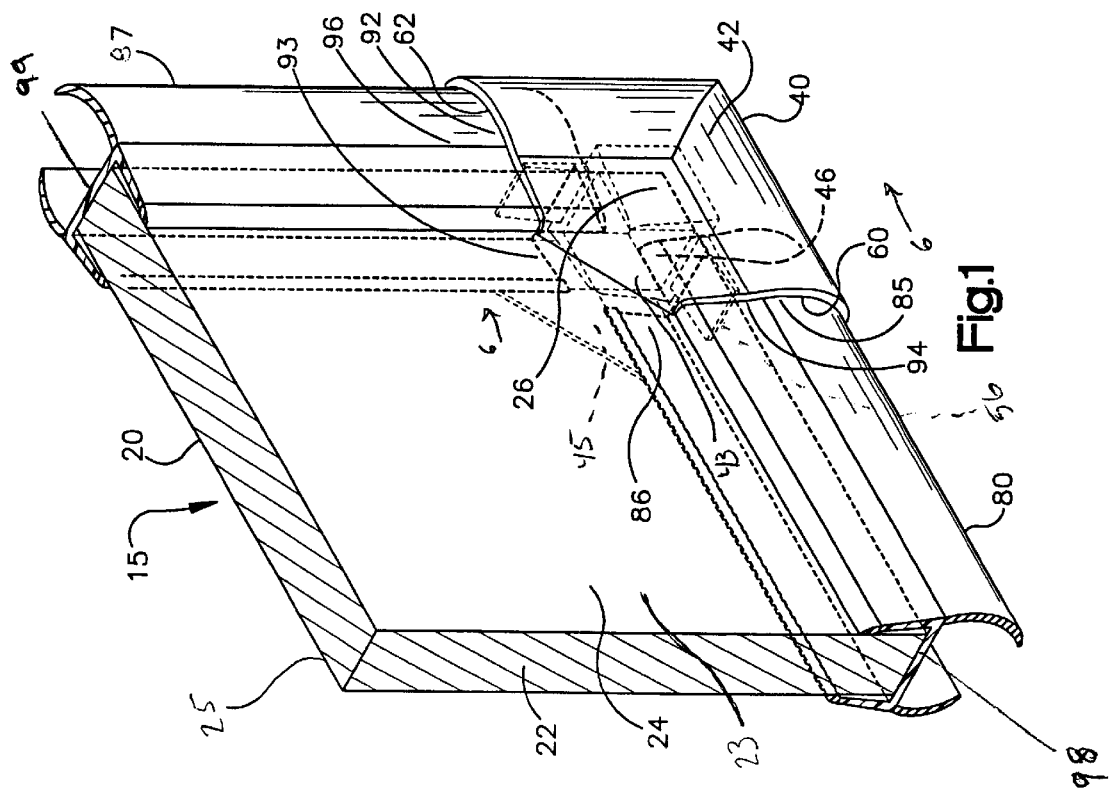

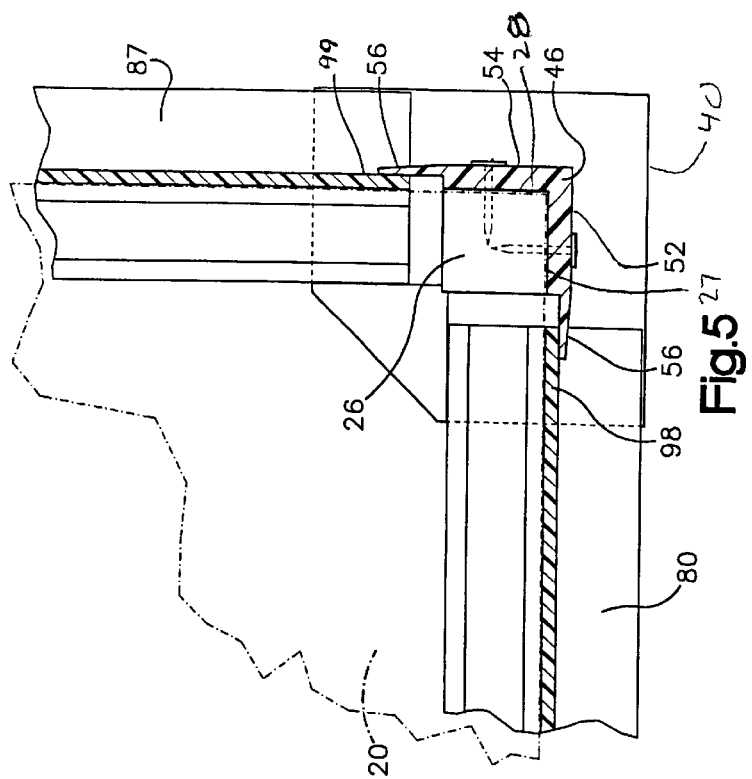
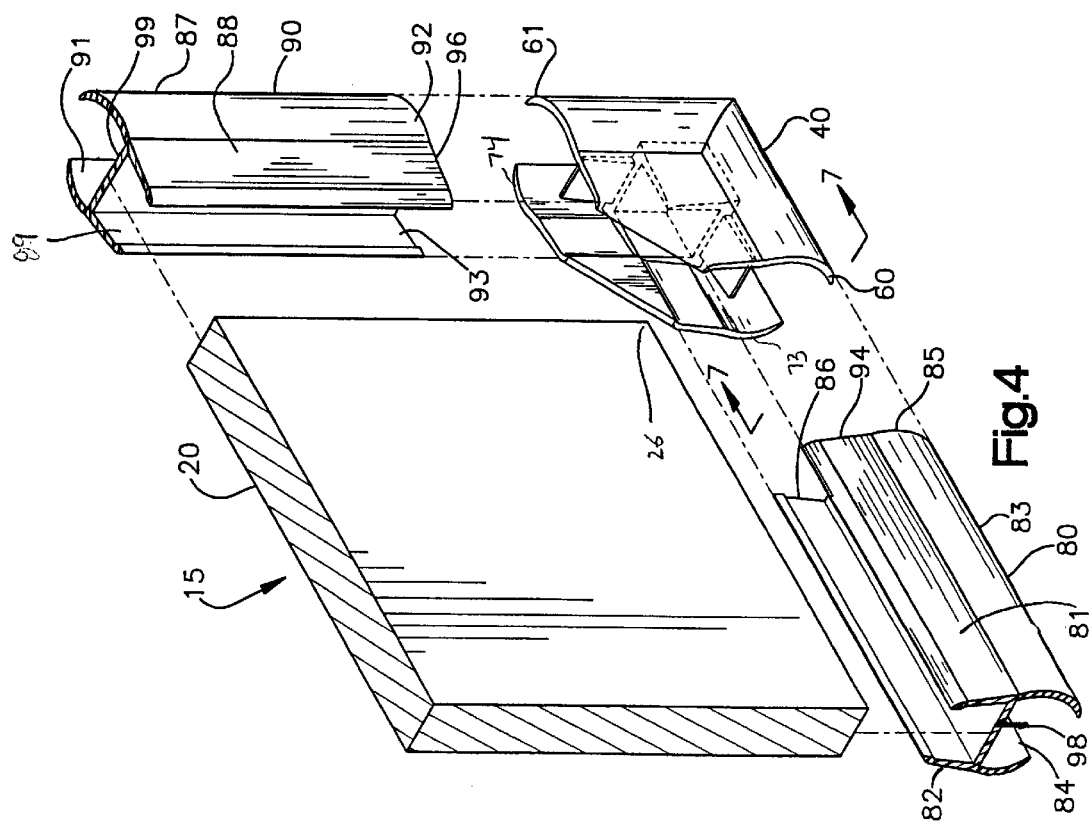

CORNER MOLD AND SEAL SYSTEM

FIELD OF THE INVENTION

This invention relates generally to structural accessories and more specifically to a corner mold which can also be used as part of a seal system.

BACKGROUND OF THE INVENTION

Protecting the edges of a structure is important to preserve the physical integrity of the structure. Often, for purposes of cost and weight, structures are formed with a light inexpensive core and a durable outside cladding. Often a seal or molding is used to cover the edge where the cladding does not cover the core. Alternatively, seals or moldings are used on unclad structures along edges where the structure contacts an adjacent structure. These contacts, without the presence of a seal, can wear away protective coatings, such as paint. These seals or moldings typically are in two pieces which are sealed together at the corner of the structure. Otherwise, liquid can penetrate behind the seal and rot or corrode the structure or its core. In addition, the seal's purpose is to create a barrier covering the gap between two adjacent structures. For example, a seal used on a tractor-trailer covers the gap between the trailer door and trailer body, thus, preventing water or inclement weather from penetrating inside the trailer cargo area and damaging cargo therein.

Some methods of forming a corner seal are extremely labor intensive. In one method two moldings are precision miter cut in order that they may be abutted at the corner of a structure. An example of this seal in shown in FIG. 8. These moldings must then be fitted together and two flat, flexible arrow strips are placed where the inner and outer molding surfaces of each molding meet to seal their joint. The arrow strips must be preheated in order for a bonding agent to activate and adhere to make a secure seal. To place the arrow strips precisely on the inner flange surfaces, the structure must be completely turned over after the first strip is applied to the outer molding surfaces. A rigid PVC corner tab is then typically spot/sonic welded on the corner of the structure (through the moldings) in order to seal the mitered joint on the interior. The miter seal also is wasteful of material. Because the moldings are typically supplied having squared ends, a miter cut must be performed on each molding. The material cut off is waste.

For the foregoing reasons, there is a need for a corner mold, and an effective seal system, which can be inexpensively made. Further, there is a need for a method of forming such a seal system, which avoids the need to make precision cuts and which can be done quickly and easily.

SUMMARY OF THE INVENTION

The present invention is directed to an inexpensive corner mold and seal system and a method for forming the seal system which does not require precision manipulation or placement of the corner mold and which satisfies the need for quick and easy fabrication at a low price.

The present invention is directed to a corner mold having a first external member, a second external member and a spacer which separates the two, for use on the corner of a structure as a cap whereby an inner edge of the first external member overlappingly abuts an outer surface of the structure, an inner edge of the second external member overlappingly abuts an inner surface of the structure and the spacer engages a first and a second side surface of the structure. The present invention also is directed to a seal system which uses the above mentioned corner mold in combination with two moldings, whereby the moldings overlappingly abut the outer and inner surfaces of the structure and engage the two side surfaces respectively. The corner mold is then attached to the already installed moldings and the structure, the first external member overlappingly abutting the moldings and the outer surface of the structure, the second external member overlappingly abutting the moldings and the inner surface of the structure, and the spacer engaging the first and second side surfaces of the structure. Compared to seal systems currently in use, the present invention uses shorter molding sections, and thus saves material cost associated with the moldings.

The present invention is also directed to a method of forming the seal system which is far less labor intensive than known methods of forming similar seal systems. The method includes the steps of attaching two moldings to a structure, then attaching a corner mold to the structure and to the moldings at the same time. This method is faster and, thus, more cost effective than methods currently being practiced. This method also does not require precise alignment of adjacent parts, meaning no seal systems should fail or be scrapped due to poorly sealed joints.

These and other features, aspects and advantages of the present invention will be fully described by the following description, appended claims, and accompanying drawings.

BRIEF DESCRIPTION OF THE FIGURES

FIG. 1 is a perspective view of the corner mold and seal system attached to a structure;

FIG. 2 is a perspective view of the corner mold;

FIG. 4 is an exploded view of the components of the seal system;

FIG. 5 is a cut-away view of the seal system attached to the corner of a structure;

DETAILED DESCRIPTION OF THE INVENTION

Referring to FIG. 1, a schematic view of a seal system 15 is shown. The seal system 15 comprises a structure 20, two moldings 80 and 87 which are in contact with the structure 20, and a corner mold 40 which is in contact with both the structure 20 and the two moldings 80 and 87.

Figure 3:
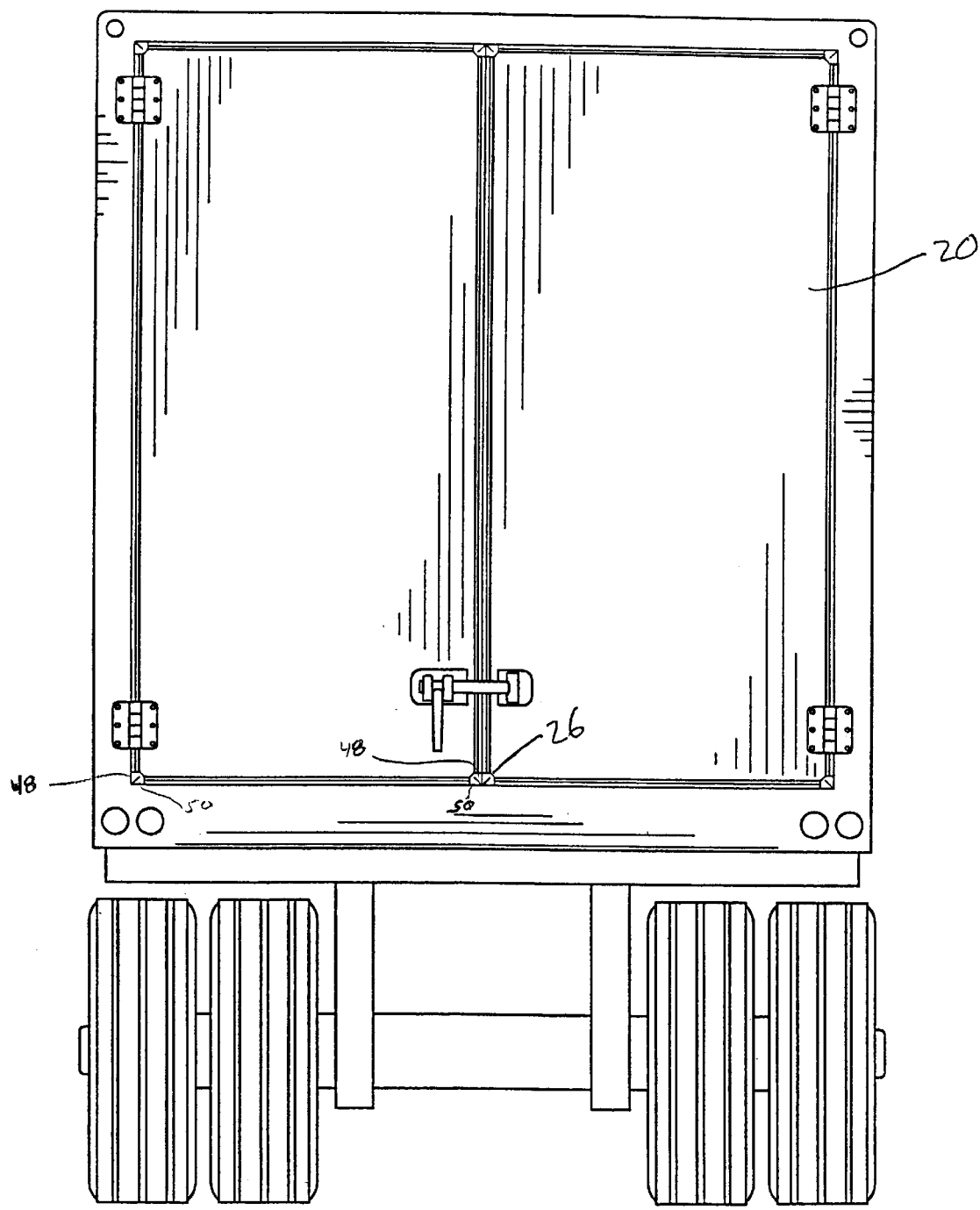
FIG. 3 is a rear view of a tractor-trailer using the corner mold and seal system.

The structure 20 is typically a swing door on a tractor-trailer, as shown in FIG. 3, but may be any structure having a corner 26. The structure 20 as shown has a rectangular shape, but may also be other shapes which have corners such as triangles, partial rectangles, and other shapes with angled or rounded corners. Referring again to FIG. 1, the structure 20, such as a tractor-trailer door, typically has a core 22 and cladding 23, but may also be a solid without cladding or a covering. The structure has an outer surface 24 and an inner surface 25 which may be the surfaces of the cladding 23, if present. The structure 20 as shown has a core 22 of wood and cladding 23 made of metal. However, the core 22 may also be plastic, foam, metal, fiberglass or a composite and the cladding 23 may be plastic, metal, wood, fiberglass or a composite material. The structure 20 functions as a support for the moldings 80 and 87 and the corner mold 40 and in turn is protected from the environment by the moldings 80 and 87 and the corner mold 40. When the structure 20 has a core 22 and cladding 23, the moldings 80 and 87 and corner mold 40 are oriented to cover the core 22 from exposure to the environment. The moldings 80 and 87 and corner mold 40 protect a structure 20, with or without cladding, from the wear caused by contact with other structures.

As shown in FIGS. 1 and 2, the corner mold 40, which is for use on a corner 26 of a structure 20, comprises a first external member 42 and a second external member 44 which is spaced apart from the first external member 42. When the corner mold 40 is attached to the structure 20, the first external member 42 has an inner edge 43 that overlappingly abuts the outer surface 24 of the structure 20 while the second external member 44 has an inner edge 45 that overlappingly abuts the inner surface 25 of the structure. As shown in FIGS. 2 and 5, a transverse spacer 46 is interconnected with the first and second external members 42 and 44 and is engaged to first and second side surfaces 27 and 28 of the structure 20.

The first external member 42 may further include two flexible curled lips 48 and 50 for selective engagement with an adjacent structure or structures. FIG. 3 shows the lips 48 and 50 both engaging the outer frame of a trailer in one position of use of the corner mold 40 and the first lip 48 engaging an adjacent door while the second lip 50 engages the trailer structure in a second position of use. Contact with a second structure is shown in detail in FIG. 7. Referring again to FIG. 2, the lips 48 and 50 curl towards the second external member 44 at the outermost lip edges 49 and 51 respectively. First external member 42 further includes two sealing edges 60 and 61 for contacting first and second moldings 80 and 87 and an inner edge 43 for contacting the outer surface 24 of the structure 20. Referring to FIG. 4, sealing edges 60 and 61 are contoured to overlap and match the contour of a first molding contact edge 85 of the first molding 80 and a first molding contact edge 92 of the second molding 87, respectively. As shown in FIG. 2, the corner mold 40 is typically a single injection molded piece. The material of construction may be polyvinyl chloride (PVC) but may be other materials such as PVC flexible plastic, thermo plastic rubber, or rubber. Alternatively, the corner mold 40 may be formed from a combination of the above-mentioned materials, or a combination of two variations of the same material having differing physical properties.

Figure 7:
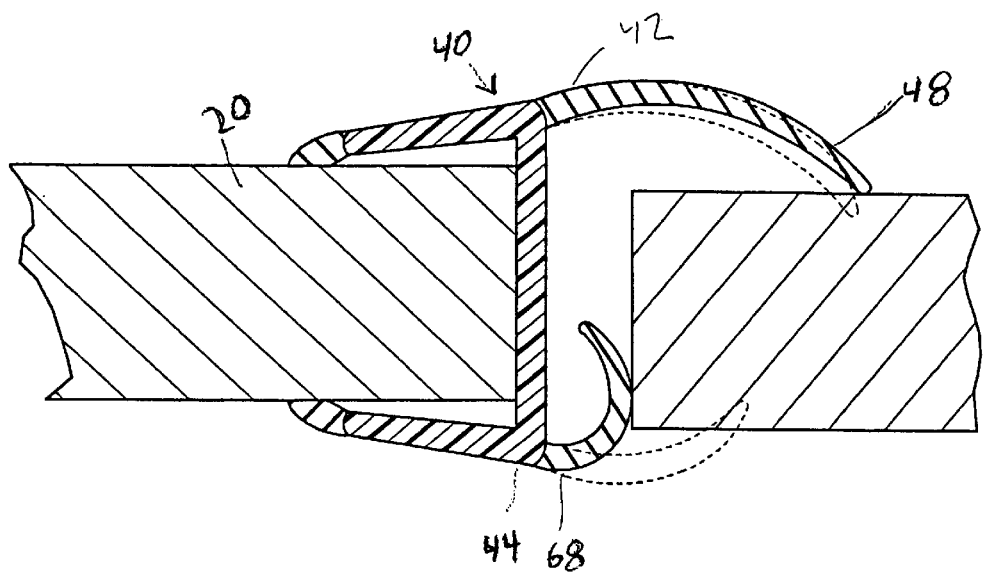
FIG. 7 is a cut-away view of the corner mold forming a seal with an adjacent structure.
Figure 6:
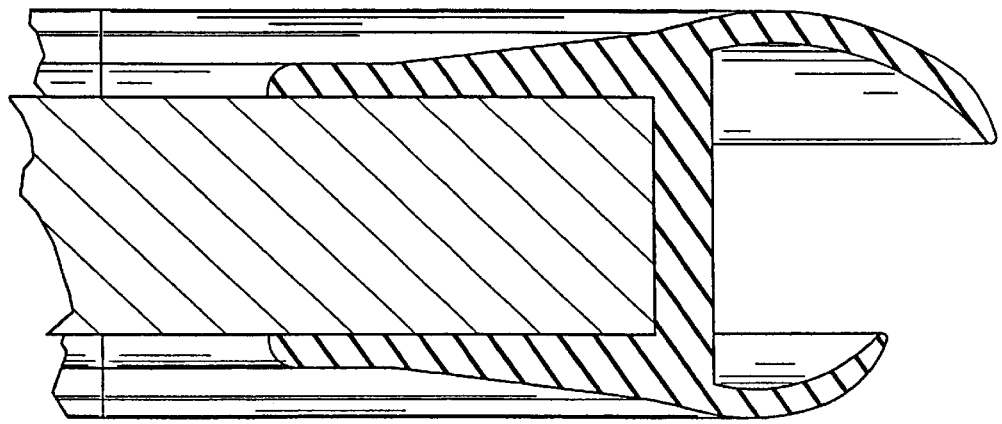
FIG. 6 is a cut-away view of a corner mold as part of the seal system.

Referring to FIGS. 1 and 2, the first external member 42 is interconnected with the transverse spacer 46 and when used within the seal system 15 contacts and partially covers the first molding 80, the second molding 87, and the outer surface 24 of the structure 20. Coverage may be for ornamental reasons as well as forming part of the sealing system. The first external member 42 may be secured to the first molding 80. If secured using an adhesive, the joint between the first external member 42 and the first molding 80 is an adhesive joint. Similarly, the joint between the first external member 42 and the second molding 87 may be an adhesive joint. The lips 48 and 50 of the corner mold 40 are adjacently located such as for a structure 20 having a right angled corner 26, as shown. The size of the first external member 42 depends on the size of the structure 20 and the corner 26 thereof. In an exemplary embodiment of corner mold 40 as illustrated, the surface area of the first external member 42 is greater than the surface area of the second external member 44. The first external member 42 is oriented on the exterior side of the structure 20 if the structure 20 is a door, thus allowing an overlapping seal to be formed over the gap between adjacent structures as shown in FIG. 7.

Referring again to FIGS. 1, 2 and 4, the second external member 44, like the first external member 42 may include two flexible curled lips 68 and 70 for selective engagement with an adjacent structure or structures. The lips 68 and 70 curl towards the first external member 42 at outermost lip edges 69 and 71 respectively. Second external member 44 further includes two sealing edges 73 and 74 for contacting first and second moldings 80 and 87 and an inner edge 45 for contacting the inner surface 25 of the structure 20. Sealing edges 73 and 74 are contoured to overlap and match the contour of two molding sealing edges 86 and 93. The second external member 44 is made from the same material as the rest of the corner mold 40. The second external member 44 functions to cover the traverse spacer 46 and portions of the structure 20 and moldings 80 and 87. Coverage can be for both ornamental reasons and as part of a sealing system 15.

The joint between the second external member 44 and the first and second moldings 80 and 87 can be an adhesive joint. The size of the second external member 44 depends on the size of the structure 20 and the corner 26 thereof. The second external member 44 is oriented on the interior side of the structure 20 if the structure 20 is a door in order to form the seal shown in FIG. 7. The lips 68 and 70 of the second external member 44 are adjacent to each other such as for a structure 20 having a right angled corner 26, as shown in FIG. 1.

Referring to FIGS. 2 and 5, the traverse spacer 46 interconnects the first external member 42 and the second external member 44. The spacer 46 may further include one or more tabs 56. When the corner mold 40 is attached to the structure 20, the tabs 56 cover any gaps between the corner mold 40 and the first and second moldings, 80 and 87. The spacer 46 may be any shape depending on the shape of the structure 20, but as shown is a V-shaped solid of a substantially constant thickness and depth. The spacer 46 comprises a first wall 52 and a second wall 54 which intersects the first wall 52. The first external member 42 may have a reinforcing section 55 which is an area of increased thickness in the area of intersection with the spacer 46. Likewise the second external member 44 may have a reinforcing section 53 at the area of intersection with the spacer 46. The spacer 46 is manufactured from the same material as the first external member 42 and the second external member 44. As an alternative, spacer 46 can be made of a material having more strength or durability than the first external member 42 and second external member 44. The spacer 46 functions to separate the first external member 42 and second external member 44 at a desired distance. The spacer 46 also functions as a point of engagement between the corner mold 40 and the side surfaces 27 and 28 of the structure 20.

The spacer 46 is transverse, meaning that it intersects the first external member 42 and the second external member 44 in a crosswise direction. The orientation between the spacer 46 and either the first 42 and second external member 44 can be at any angle, including a perpendicular orientation. If the spacer 46 comprises two intersecting walls 52 and 54, the walls 52 and 54 may intersect at any angle including ninety degrees. The tabs 56 extend along a common plane with the intersecting walls 52 and 54. In the seal system 15, the tabs 56 are in physical contact with two narrow-walled transverse spacers 98 and 99 that are connected to and help to form moldings 80 and 87 as further described below.

Referring to FIG. 4, the first molding 80 and second molding 87 are extruded sections which are commercially available and known as "Truck Swing Door seals/gaskets", available from Atlantis Plastics, Advanced Weather Seal and other manufacturers. The first molding 80 and second molding 87 have a back to back channel or H-shaped cross section. First molding 80 comprises a first molding member 81 and a second molding member 82, which are interconnected by the transverse spacer 98. First molding 80 further comprises first and second flexible molding lips 83 and 84 which may be engaged and disengaged with an adjoining structure. First molding 80 also has first and second sealing edges 85 and 86 and a first end 94 which is squared.

Second molding 87 comprises a first molding member 88 and a second molding member 89, which are interconnected by the transverse spacer 99. Second molding 87 further comprises first and second flexible molding lips 90 and 91 which may be engaged and disengaged with an adjoining structure. Second molding 87 also has first and second sealing edges 92 and 93 and a first end 96 which is squared. Each molding 80 and 87 is made from a material such as plastic although aluminum and rubber may also be used. Each molding 80 and 87 is a dual durometer extrusion of one or more of these materials or variations of these materials. This provides rigidity in some areas and flexibility in other areas where it is most needed. The moldings 80 and 87 finction as a seal for the core 22 of the structure 20 and a seal of the gap between the structure 20 and an adjacent structure such as and the trailer door and trailer body or two doors on a tractor trailer as shown in FIG. 3.

Figure 9:
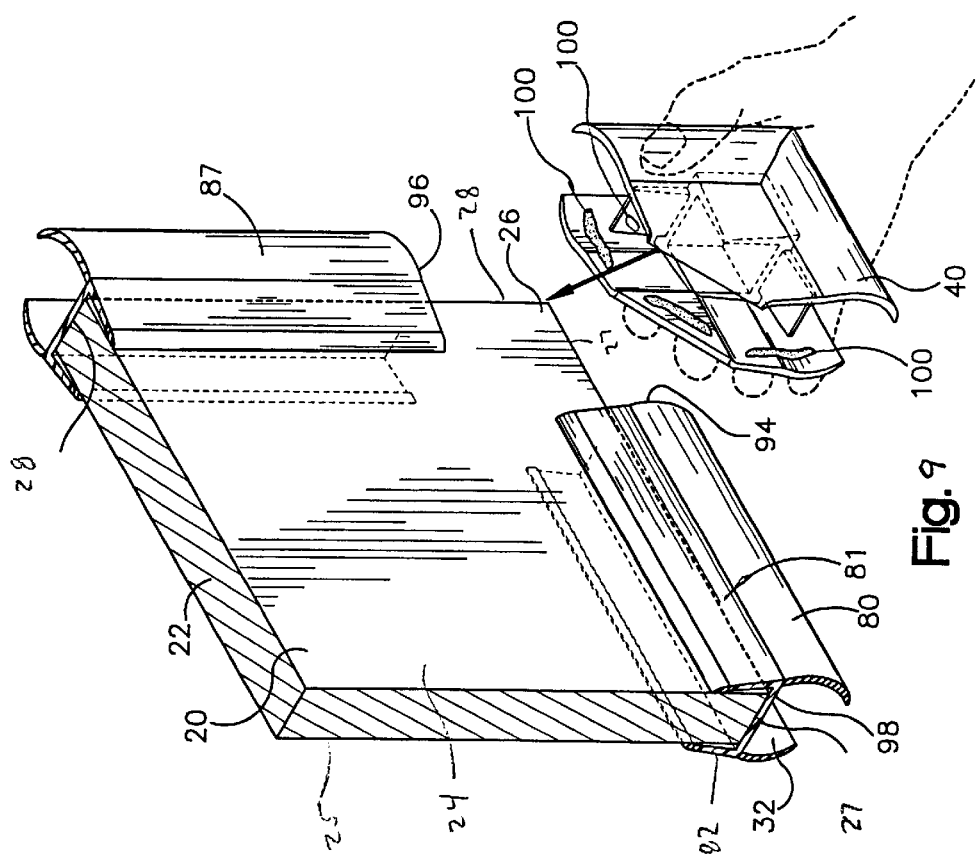
FIG. 9 is a perspective view of a method of forming the seal system, specifically showing attachment of the corner mold.
Figure 8:
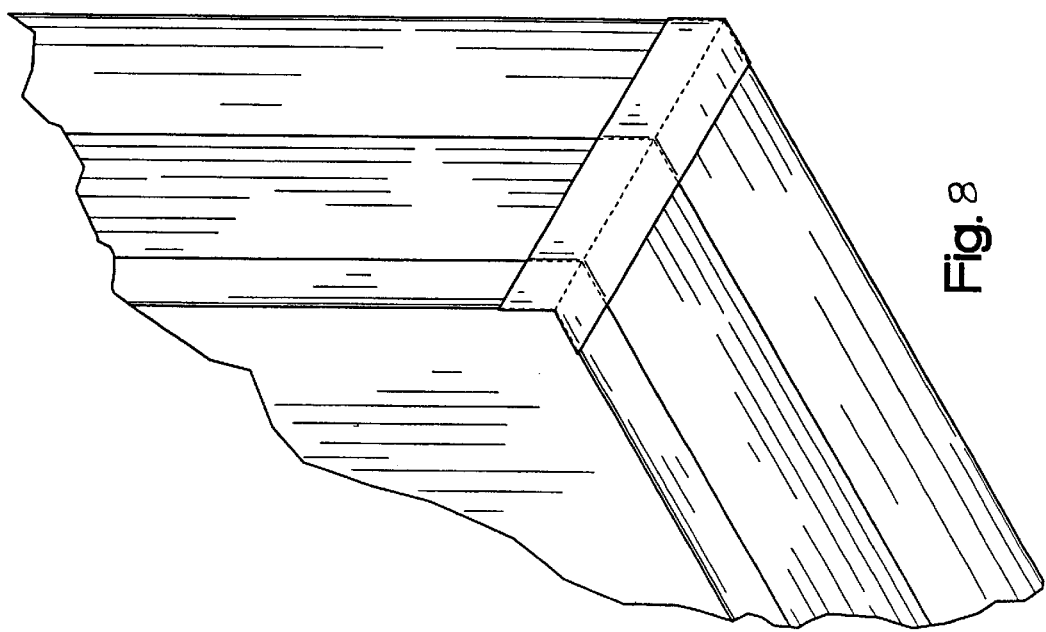
FIG. 8 is perspective view of another seal system used in the industry.

Referring to FIGS. 1, 5 and 9, the first and second moldings 80 and 87 engage the structure 20. The first and second external molding members 81 and 82 pinchingly grasp the outer surface 24 and the inner surface 25 of the structure 20. The first molding spacer 98 abuts the first side surface 27 of the structure 20. The square cut end 94 of the first molding 80 is oriented in close proximity to the corner 26 of the structure 20. Likewise, the square cut end 96 of the second molding 87 is oriented in close proximity to the corner 26 of the structure 20, but does not overlap the square cut end 94 of the first molding 80. The first external member 42 of the corner mold 40 is adhesively attached to the first molding 80. The first external member 42 of the corner mold 40 is adhesively attached to the second molding 87. The tabs 56 upon the corner mold 40 are adhesively attached to the molding spacers 98 and 99 of the first molding 80 and second molding 87. The square cut end 94 of the first molding 80 and the square cut end 96 of the second molding 87 are in close proximity to the corner mold 40.

In the seal system 15 an adhesive 100 may be used. The adhesive 100 is a liquid which dries to form a flexible solid. The adhesive 100 can be methyl ethyl ketone (MEK) based or super glue based. The adhesive 100 may be used in the following areas: between the tabs 56 and the first and second molding spacers 98 and 99, between the first external member 42 of the corner mold 40 and the first molding 80, between the first external member 42 and the second molding 87, between the first external member 42 and the outer surface 24 of the structure, between the second external member 44 of the corner mold 40 and the first molding 80, between the second external member 44 and the second molding 87, between the second external member 44 and the inner surface 25 of the structure, and between the spacer 46 and the side surfaces 27 and 28 of the structure 20. Alternatively, mechanical fasteners such as nails, rivets, or screws may be used to secure the spacer 46 with the side surfaces 27 and 28 of the structure 20.

A method for forming the present seal system invention comprises the steps of attaching moldings 80 and 87 to a structure 20, attaching a corner mold 40 to the corner 26 of the structure 20 while attaching the corner mold 40 to the moldings 80 and 87 using an adhesive 100.

In the step of attaching the moldings 80 and 87 to the structure 20 the square cut end 94 of the first molding 80 is oriented in close proximity to the corner 26 of the structure 20. Then the square cut end 96 of the second molding 87 is oriented in close proximity to the corner 26 of the structure 20. The moldings 80 and 87 are spaced, with respect to the corner 26 of the structure 20, such that the spacer 46 of the corner mold 40 when attached to the structure 20 will cover parts of the core 22 of the structure 20 not covered by the moldings 80 and 87. The first and second external molding members 81 and 82 pinchingly engage the outer surface 24 and the inner surface 25 of the structure 20.

In the step of attaching the corner mold 40 to the structure 20, adhesive 100 is liberally applied to the corner mold 40. Adhesive may be applied to the interior surfaces of the first external member and the second external member. Adhesive may also be applied to the interior surfaces of the spacer 46 and the tabs 56. Adhesive may also be applied to the sealing edges 85 and 86 of the first molding 80, the sealing edges 92 and 93 of the second molding 87 and to the outer 24, inner 25 and side surfaces 27 and 28 of the structure 20. The corner mold 40 is pressed against the structure 20 having the first external member 42 overlap the first sealing edge 85 of the first molding 80 and the first sealing edge 92 of the second molding 87. Alternatively the spacer 46 may be attached to the structure mechanically using nail, rivets, or screws. The second external member 44 overlaps the second sealing edge 86 of the first molding 80 and the second sealing edge 93 of the second molding 87. When in place, the corner mold 40 completely covers the corner 26 of the structure 20.

As shown in FIG. 3, the invention may be used on the swing doors of a tractor-trailer truck, but may be used on any structure. The corner mold 40 may be used simply as an ornamental covering for a corner of a structure or as a part of a seal system. The seal system is used to keep detrimental substances, namely, water away from the core of the structure, thus preserving the integrity of the structure. When used on swing doors, the seal system also keeps detrimental substances away from the interior of the vehicle.

When used on a swing door, the corner mold 40 and moldings 80 and 87 are deformed when the door is closed. The two flexible curled lips 48 and 50 of the first external member 42 of the corner mold, seal over the surface of the adjoining structure or door as shown in FIG. 7. Similarly, the first molding lips 83 and 90 of the first and second moldings, respectively, seal over the surface of the adjoining structure. The two flexible curled lips 68 and 70 of the second internal member 44 collapse or fold inwards when brought in contact with the adjoining structure or door. Similarly, the second moldings lips 84 and 91 of the first and second moldings respectively, collapse or fold inwards when brought in contact with the adjoining structure or door.

This invention satisfies the need for a corner mold, and effective seal system, which can be inexpensively made. This invention satisfies the need for a method for forming such a seal system which can be done quickly and easily Additional advantages and modifications will readily appear to those skilled in the art. For example, different methods of attaching the corner mold to the moldings may be utilized. Further different materials or composites may be used to form the corner mold or the moldings. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A corner mold for use with adjacent moldings to seal a corner of a structure, said corner mold comprising:
    a first external member including first and second sealing edges for overlappingly contacting adjacent moldings;
    a second external member spaced apart from said first external member; a transverse spacer for engagement with the corner of the structure, said spacer interconnecting said first and second external members.

2. The corner mold of claim 1 wherein said transverse spacer comprises a first wall and a second wall wherein said first wall and said second wall are intersecting.

3. The corner mold of claim 1 wherein said transverse spacer further includes one or more tabs for overlappingly contacting a portion of one or more moldings.

4. The corner mold of claim 1 wherein said first external member includes a first and second flexible curled lip for effective sealing engagement, and said second external member includes a first and second flexible curled lip for effective sealing engagement.

5. The corner mold of claim 1 wherein said corner mold is a single molded piece.

6. The corner mold of claim 5 wherein said corner mold is made from Polyvinyl Chloride.

7. A seal system used to protect the physical integrity of a structure from detrimental substances and for use, in conjunction with one or more adjacent structures, as a barrier covering a gap between the structure and the adjacent structure(s) comprising:
    a structure;
    a first molding in supporting engagement along a first edge of said structure;
    a second molding in supporting engagement along a second adjacent edge of said structure;
    a corner mold in supporting engagement with said structure and in adhesive contact with said first and second moldings, said corner mold having a first external member including a first sealing edge for overlappingly contacting said first molding and a second sealing edge for overlappingly contacting said second molding, a second external member spaced apart from said first external member and a transverse spacer interconnecting said first and second external members.

8. The seal system of claim 7 wherein said corner mold is made from Polyvinyl Chloride.

9. The seal system of claim 7 wherein said first molding has a first squared end proximate to said corner mold and said second molding has a first squared end proximate to said corner mold wherein said second molding does not overlap said first molding.

10. The seal system of claim 7 wherein the structure is a swing type door on a tractor-trailer.

11. The seal system of claim 7 wherein said first and second moldings are constructed of a dual durometer plastic extrusion.

12. The seal system of claim 7 wherein said first external member includes a first flexible curled lip adhesively attached to said first molding and a second flexible curled lip adhesively attached to said second molding.

13. The seal system of claim 7 further including a first adjacent structure which is a second swing type door on a tractor trailer.

14. The seal system of claim 7 further including a first adjacent structure which is a trailer frame.

15. The seal system of claim 7 wherein said transverse spacer further includes tabs for overlappingly contacting said first and second moldings.

16. The seal system of claim 15 wherein said tabs are attached to said first and second moldings with adhesive.

17. A method of forming a seal on a corner of a structure comprising the following steps:
    a) providing a corner mold having a first external member, a second external member spaced apart from said first external member and a transverse spacer interconnecting said first and second external members;
    b) attaching a first molding having first and second spaced molding members, first and second spaced molding lip members, first and second sealing edges, and a leg spacer interconnected to said first and second spaced molding members to said structure;
    c) attaching a second molding having first and second spaced molding members, first and second spaced molding lip members, first and second sealing edges, and a leg spacer interconnected to said first and second spaced molding members to said structure;
    d) attaching said corner mold to said structure wherein said corner mold overlapingly abuts said first and second moldings.

18. The method of forming a seal according to claim 17 wherein said corner mold is attached to said structure using adhesive.

19. The method of forming a seal according to claim 17 wherein said corner mold is attached to said structure using mechanical means for attachment.

20. The method of forming a seal according to claim 17 wherein said corner mold is adhesively attached to said first and second moldings.

* * * * *